United States Patent [19]

Masuzawa et al.

[11] 4,355,367
[45] Oct. 19, 1982

[54] WAVEFORM SYNTHESIZER ARRANGEMENT

[75] Inventors: Shigeaki Masuzawa, Nara; Shinya Shibata, Yamatokoriyama; Tetsuo Iwase; Hiroshi Miyazaki, both of Nara, all of Japan

[73] Assignee: Sharp Kabushiki Kaisha, Osaka, Japan

[21] Appl. No.: 127,379

[22] Filed: Mar. 5, 1980

[30] Foreign Application Priority Data

Mar. 7, 1979 [JP] Japan .................................. 54-28061

[51] Int. Cl.$^3$ ............................................. G06F 15/31
[52] U.S. Cl. .................................... 364/718; 328/14; 364/574; 328/167; 364/724
[58] Field of Search ............... 364/571, 574, 577, 718, 364/721, 723-724; 328/14, 135, 150, 151, 165, 167; 333/20

[56] References Cited

U.S. PATENT DOCUMENTS

| 3,529,138 | 9/1970 | Andre et al. | 364/718 |
| 3,633,017 | 1/1972 | Crooke et al. | 364/721 |
| 3,657,657 | 4/1972 | Jefferson | 328/14 |
| 4,194,183 | 3/1980 | Neuner et al. | 364/574 X |

*Primary Examiner*—Jerry Smith
*Attorney, Agent, or Firm*—Birch, Stewart, Kolasch & Birch

[57] ABSTRACT

A waveform synthesizer arrangement for use in an audible output device is adapted to synthesize desired waveforms and includes a digital filter to reduce the generation of output noise. A time sequential process is effected on data to be reproduced which considers the total nature of waveforms of interest thus performing proper waveform adjustment to avoid acute changes in the waveforms. The time sequential process is affected by previous data and has the effect on the frequency construction of the resulting waveform.

9 Claims, 8 Drawing Figures

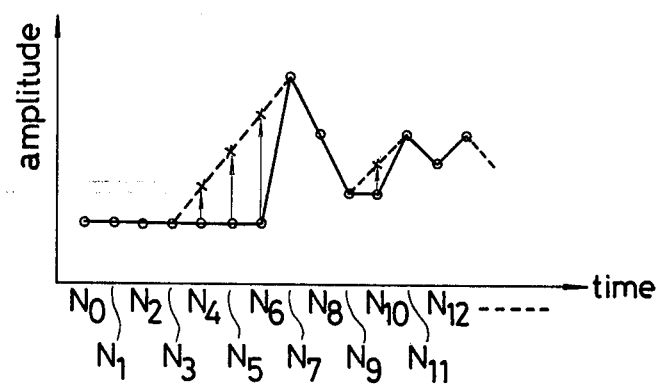
F I G. 1
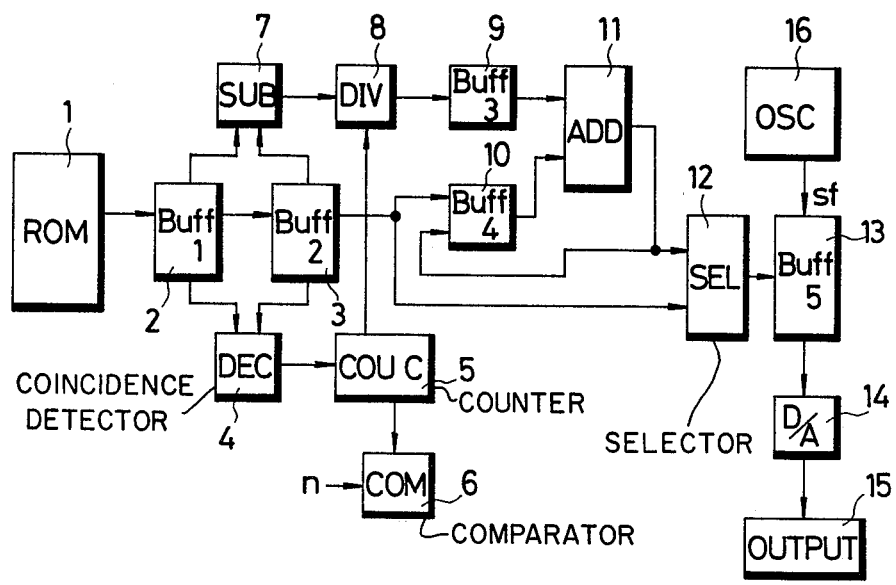
F I G. 2

WAVEFORM SYNTHESIZER ARRANGEMENT

BACKGROUND OF THE INVENTION

This invention relates to a waveform synthesizer arrangement for use in various audible output devices.

Generally, in the case where digital information signals which are to be eventually converted into an analog form are derived in a sequence of time, noise in a resulting synthesized waveform varies in nature according to the physical density of digitally encoded data and resolution of quantized values.

While noise can be actually reduced by increasing sampling frequency and the amount of quantized bits, this is disadvantageous due to an increase in the number of data to be treated.

The inventors have recognized that a synthesized waveform with a minimum generation of noise may be easily recoverable when a given process is executed on the data to be reproduced with a consideration of the total nature of the waveform of interest. Since respective values of the data subject to a time sequential process are affected by previous data and have the effect on the frequency construction of resulting waveforms in conjunction with the relative position of the data, it has been found that it is possible to minimize noise harsh to the human's ear by carrying out the time sequential process to exhibit some filtering effect.

OBJECTS AND SUMMARY OF THE INVENTION

Accordingly, it is a general object of the present invention to provide a waveform synthesizer arrangement which may produce any synthesized waveforms with a minimum level of noise depending on the foregoing findings by the inventors.

Briefly, according to the present invention a waveform synthesizer arrangement is provided which comprises memory means for storing quantized waveform information in the form of digital signals, means for obtaining said waveform information as a parameter of sampling time, means for executing arithmetic operations in response to said parameter information, means for providing proper waveform adjustment for a desired one of the parameters in accordance with the results of the arithmetic operations, and means for converting said digital waveform information into analog information.

BRIEF DESCRIPTION OF THE DRAWINGS

The foregoing as well as other objects, features and advantages of the present invention will become more readily appreciated upon the consideration of the following detailed description of the illustrated embodiments, together with the accompanying drawings, wherein:

FIG. 1 is a waveform diagram plotting amplitude as a function of time for explanation of a waveform synthesizer arrangement constructed in accordance with the present invention;

FIG. 2 is a schematic block diagram of the waveform synthesizer arrangement of the present invention;

DETAILED DESCRIPTION OF THE ILLUSTRATED EMBODIMENTS

Figure 3:
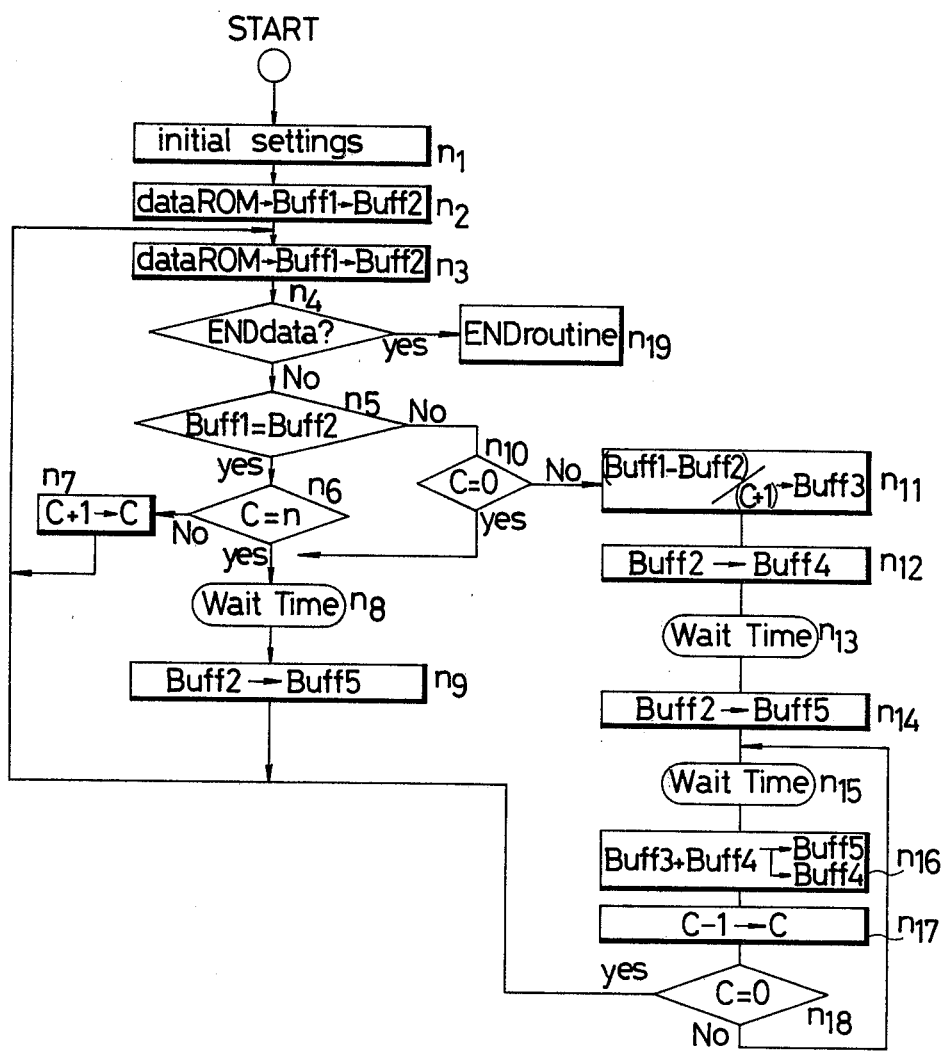
FIG. 3 is a flow chart illustrating the operation of the arrangement of FIG. 2.

Referring initially to FIG. 1, there is illustrated a waveform diagram for explanation of operation of a waveform synthesizer arrangement constructed in accordance with one preferred embodiment of the present invention, wherein quantized amplitude is plotted as a function of time. Briefly speaking, a specific waveform of interest is previously sampled and qualified values (sampled values) $N_0-N_i$ are derived every sampling frequency.

The waveform as shown in full lines is derived in the case when the synthesizer arrangement does not utilize the present invention, whereas the counterpart as shown in broken lines is derived in the case that present invention is embodied in the synthesizer arrangement. In other words, according to the principle of the present invention, the respective values $N_4$, $N_5$, $N_6$ and $N_{10}$ as identified by O are modified or adjusted to respective values of amplitude as identified by X for provision of outputs, thus flattening accute changes in waveform and providing desirable synthesized waveforms with a minimum noise.

FIG. 2 is a schematic block diagram of an arrangement for implementing the present invention, wherein a memory generally designated 1 may be, for example, a read only memory (ROM). This ROM stores the previously sampled and quantized digital values $N_i$. Buffer memories 2, 3, 9, 10 and 13 store temporarily the data derived from the memory 1. A coincidence detector 4 is provided to decide if the data stored in the buffer register 2 is equal in amplitude to that in the register 3. A comparator 6 compares the count of a counter 5 with a preselected value n. A subtractor 7 subtracts the contents of the buffer register 3 from the contents of the buffer register 2 and executes such subtraction only if both the data stored in the buffer registers 2 and 3 are equal in amplitude to each other. A divider 9 divides the results of such subtraction by the count of the counter 5, while an adder 11 adds the contents of the buffer register 9 to that of the buffer register 10. A selector 12 selects the output of the adder 11 and the output of the buffer register 3 and feeds such selection to the input of the buffer register 13. A digital-to-analog converter 14 of a well known construction is adapted to convert digital data derived from the buffer 13 into analog data. It further includes an output circuit 15 and an oscillator 16.

Operation of the synthesizer arrangement described will be more readily understood by reference to FIG. 3 which is a flow chart of the circuit of FIG. 2.

Respective registers, flip flops and like elements within the above arrangement are first placed into their initial conditions. The data $N_1$, $N_2$, $N_3$ and so on as viewed in FIG. 1 are derived in sequence. Assume now that the value n provided for the comparator 6 is 3.

The data $N_0$ are first recalled from the memory ROM 1 and loaded into the buffer register 2. When the data $N_1$ are fetched from the memory 1 and loaded into the buffer register 2, the previous data $N_0$ is transferred into the buffer register 3. Thereafter, the coincidence detector 4 compares these sampled data values $N_0$ and $N_1$ as shown in FIG. 1 if the both are same. In the given example, it compares the contents of the counter 5 and the preselected value $n=3$ and if $C<n$ increments the contents of the counter 5 by one, allowing the next succeeding data $N_2$ to be fetched from the memory ROM 1 and further incrementing the contents of the counter 5 in the same manner described. The contents of the counter 5 are incremented by one in this manner until the data $N_3$ are processed. In other words, the steps $n_1 \rightarrow n_2 \rightarrow n_3 \rightarrow n_4 \rightarrow n_5 \rightarrow n_6 \rightarrow n_7 \rightarrow n_3 \rightarrow n_4 \rightarrow n_5 \rightarrow n_6 \rightarrow n_7 \rightarrow n_3$ and so on.

The step $n_3$ is carried out to fetch the data $N_4$ from the memory 1 and decide through the use of the coincidence detector 4 if the contents of the buffer registers 2 and 3 are both same. When $N_4 = N_3$ and the contents of the counter 5 are $C = n(=3)$, no increment of the counter 5 takes place. The contents ($N_3$) of the buffer register 3 are fed via the selector 12 in timed relationship with the sampling frequency Sf into the buffer register 13 whose contents in turn are delivered externally in the form of a synthesized waveform via the digital-to-analog converter 14 and the output circuit 15. The data $N_0$ is thus outputted in this manner. This operation is achieved by execution of the steps $n_3 \rightarrow n_4 \rightarrow n_5 \rightarrow n_6 \rightarrow n_8 \rightarrow n_9$ (see FIG. 3). During the time that the data $N_5$ and $N_6$ are fetched from the memory 1 the waveforms corresponding to the data $N_1$ and $N_2$ are developed through the buffer register 13, the digital-to-analog converter 14 and the output circuit 15, similarly.

If the data $N_7$ are derived from the memory 1 during the step $n_3$, the data $N_6$ and $N_7$ are not equal (as shown in FIG. 1) such that the subtractor 7 carries out subtraction on the buffers 1 and 2 designated 2 and 3 respectively with the results of subtraction being divided by the contents of the counter 5 i.e., (C+1), through the action of the divider 8, that is, (Buff 1−Buff 2)/(C+1). The results of this division are stored in the buffer register 9 for the time being and at the same time the contents of the buffer register 3 are sent to the next succeeding stage buffer register 10. The contents of the buffer register 3 are further fed via the selector 12 into the buffer register 13 and delivered through the circuits 14 and 15 in the same manner as described above, thus executing in succession the steps $n_3 \rightarrow n_4 \rightarrow n_5 \rightarrow n_{10} \rightarrow n_{11} \rightarrow n_{12} \rightarrow n_{13} \rightarrow n_{14}$ to output the data $N_3$. In connection with the data $N_4$ that are about to be next delivered, the adder 11 executes addition on the contents of the buffer registers 9 and 10 with the result of addition being again loaded into the buffer register 10 and then to the buffer register 13 via the selector 12. This leads to the delivery of the data $N_4$ through the digital-to-analog converter 14 and the output circuit 15. Accordingly, the waveform corresponding to the data $N_4$ is outputted at the level denoted by X not at the level denoted by O, thus making waveform adjustment as viewed in FIG. 1. Upon the delivery of the data $N_4$ the counter 5 is decremented by one and it is decided as to whether the decremented contents of the counter are zero. If not, addition is effected on the contents of the buffer registers 9 and 10 and the data $N_5$ are delivered via the buffer register 13, the digital-to-analog converter 14 and the output circuit 15. In other words, the data $N_5$ is not outputted at the level marked by O but at the level marked by X (FIG. 1). After the completion of the delivery of the data up to the data $N_6$ the counter 5 shows $C=0$ to cause the data $N_8$ to be fetched from the memory 1. The steps $n_{15} \rightarrow n_{16} \rightarrow n_{17} \rightarrow n_{18} \rightarrow n_{15} \rightarrow n_{18} \rightarrow n_3$ are therefore carried out.

The above mentioned operation is executed such that the data $N_4$-$N_6$ are varied and modified from their initial values to the different values as defined by X prior to their delivery.

At the moment when the data $N_8$ are fetched from the memory 1, the data $N_8$ and $N_7$ are respectively stored within the buffer registers 2 and 3. Since the both are different in amplitude and the counter 5 shows $C=0$, the contents of the buffer register 3 are transferred via the selector 12 into the buffer 13 and externally delivered from the digital-to-analog converter 14 and the output circuit 15. The next step is to fetch the data $N_9$ from the memory 1. This is accomplished by execution of the steps $n_3 \rightarrow n_4 \rightarrow n_5 \rightarrow n_{10} \rightarrow n_8 \rightarrow n_9 \rightarrow n_3$. During this operation the respective data are delivered as they are. In the case that only two adjacent data as $N_9$ and $N_{10}$ assume the same magnitude, they are deliverd at its intermediate level.

In this manner, accute waveforms are modified so as to reduce noise in accordance with the teachings of the present invention.

Figure 4:
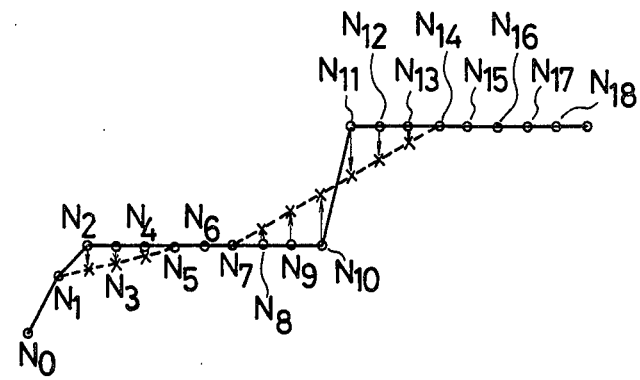
FIG. 4 is a waveform diagram for explanation of another embodiment of the present invention.

FIG. 4 is a waveform diagram for explanation of another preferred embodiment of the present invention wherein not only output values for adjustment but also a predetermined number of output values located before and after the just mentioned output values are modified for the purpose of the present invention. In the case that only one value varies between a first succession of the same data and a second succession of the same data, a predetermined number of output values before and after that transient value suffer from the adjustment process of the present invention. In other words, the waveform is derived at these modified sample values (X) other than the original sample values (O).

Figure 5:
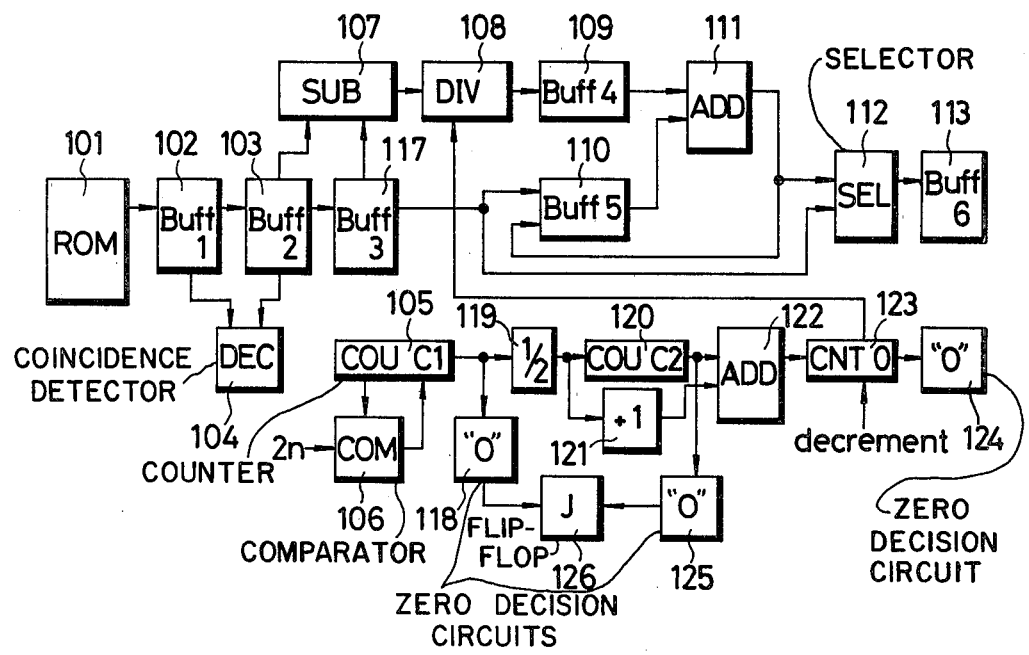
FIG. 5 is a schematic block diagram of the embodiment of the present invention as shown in FIG. 4.
Figure 6:
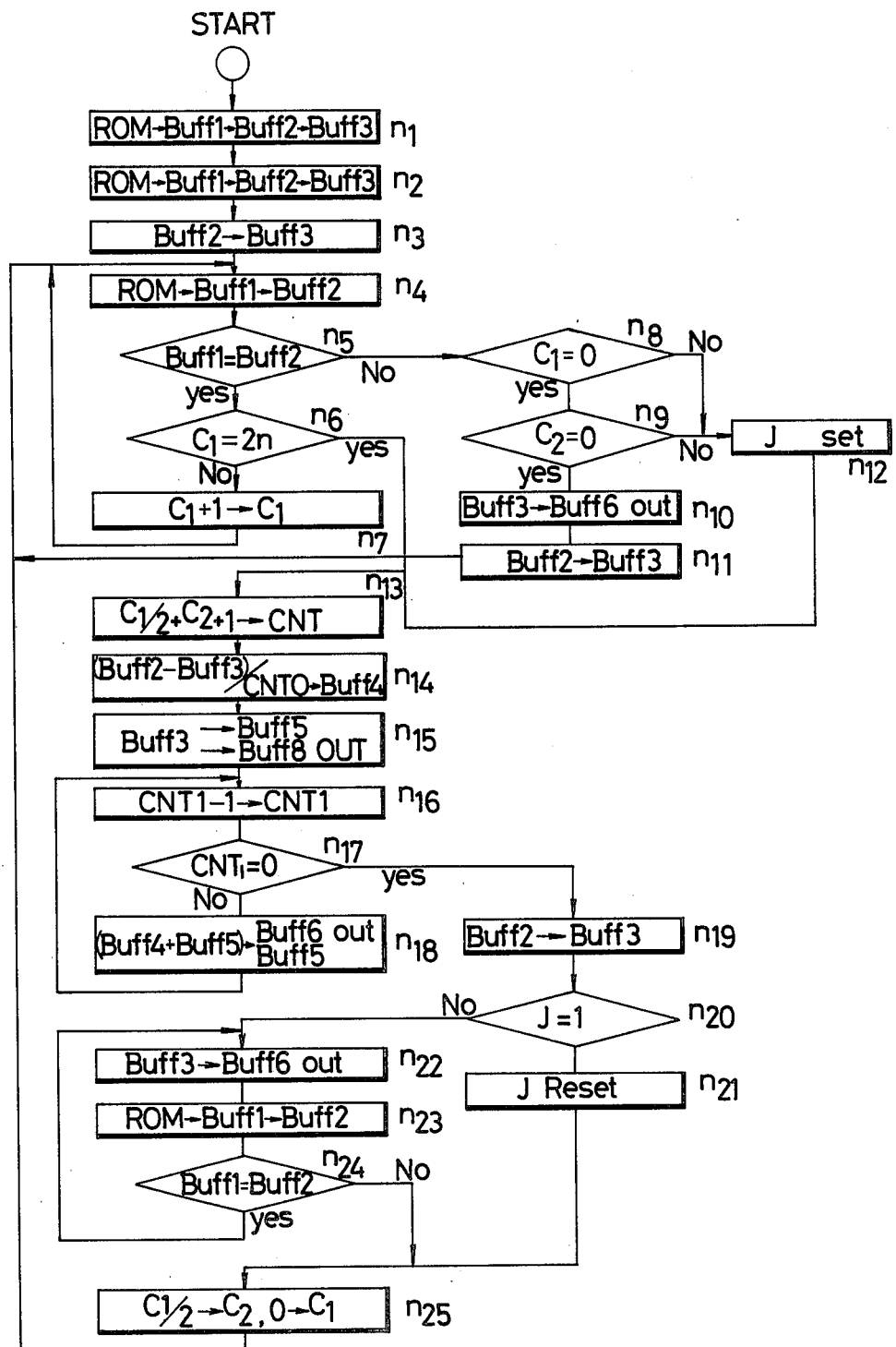
FIG. 6 is a flow chart illustrating the operation of the arrangement of FIG. 5.

FIG. 5 is a schematic block diagram for realizing synthesis of the above illustrated waveform of FIG. 4 and FIG. 6 is a flow chart for explanation of operation of the circuit arrangement shown in FIG. 5.

As noted earlier, the waveform of FIG. 4 shows only a middle part of an overall waveform to be reproduced. Thus, the data $N_0$ and $N_1$ have already stored in buffer registers 117 and 102, respectively. By the actions of a memory 101, the buffer register 102 and another buffer 103 the data $N_2$ are fetched from the memory 101 and a coincidence detector 104 provides a disparity signal and decision circuits 118 and 123 sense if the contents of counters 105 and 120 are zero, respectively. If the two counters assume zero, then the contents of a buffer 117 are shifted toward a buffer register 113. This means that the data $N_0$ are externally delivered. The data $N_0$ are delivered through a string of the steps $n_4 \rightarrow n_5 \rightarrow n_8 \rightarrow n_{10} \rightarrow n_{11} \rightarrow n_4$. Upon the fetching of the data $N_3$ the coincidence detector 104 provides an equality signal at this time and a comparator 106 decides if the contents $C_1$ of a counter 105 is equal to the value 2n applied thereto. If $C_1 = 2n$, the count $C_1$ of the counter 105 is incremented to effect $C_1 + 1 \rightarrow C_1$ and the data is fetched from the memory 101 (ROM). For example, when $n=3$, the count $C_1$ of the counter 105 is incremented by a string of the steps $n_4 \rightarrow n_5 \rightarrow n_6 \rightarrow n_7 \rightarrow n_4$. After repetition of this operation the data $N_9$ is fetched from the memory. Provided that the coincidence detector 104 provides an equality signal and the comparator 106 also provides an equality signal, the count $C_1$ of the counter 105 is added via a $\frac{1}{2}$ circuit 119 and a +1 circuit 121 to the count $C_2$ of the counter 120 by the action of an adder 122 with the result of addition being loaded into a counter CNT 123. A subtractor 107, on the other hand, reduces the contents of the buffer register 103 by that of the buffer register 117, that is, (Buff 2 − Buff 3). This result is divided by the contents of the counter (CNT0) 123 through a divider 108, with the result of division being loaded into the buffer register 109. In this instance $C_1=6$ and $C_2=0$ and thus the count of CNT is 4. Under these circumstances the contents of the buffer 117 are sent to the buffer 113 via the selector 112 and externally delivered after digital-to-analog conversion. This means the delivery of the data $N_1$. Subsequently to this, the contents of the counter CNT (123) are decremented by one and this result is monitored by a "0" detector 124. If the result is not zero, the adder 111 effects addition on the contents of the buffers 4 and 5, with the result being transferred into the buffer 113 through the selector 112. Simultaneously, the result is again loaded into the buffer 110. This implies that the data $N_2$ is externally delivered. This sequence of operation is repeated on the data up to $N_4$ until the counter CNT=0. Accordingly, the steps $n_4 \to n_5 \to n_6 \to n_{13} \to n_{14} \to n_{15} \to n_{16} \to n_{17} \to n_{18} \to n_{16}$ are executed. When When CNT=0, arithmetic operations Buff 2→Buff 3 (103→117) and Buff 3→Buff 6 (117→113) take place, thus externally delivering the data $N_5$. Then, the data $N_5$ is fetched from the memory 101 and the detector 104 senses if there is equality between the contents of the buffers 102 and 103. If yes the operation Buff 3→Buff 6 is effected. Then if the data $N_{11}$ is loaded into the buffer, no equality signal is developed so that the contents $C_1$ of the counter 105 is divided by 2 by the $\frac{1}{2}$ circuit 119 and fed into the counter 120 with the counter 105 being cleared for further readout of the data. This operation is accomplished by a string of the steps $n_{17} \to n_{19} \to n_{20} \to n_{22} \to n_{23} \to n_{24} \to n_{22} \to n_{23} \to n_{24} \to \ldots n_{25} \to n_4$. The same data thereafter continues to be fetched by the steps $n_4 \to n_5 \to n_6 \to n_7 \to n_4$ until the comparator 106 develops an equality signal. During the step $n_4$ the data $N_{18}$ is fetched to allow the comparator 106 to provide the equality signal. The steps $n_{13}$ and $n_{14}$ place "7" into the counter CNT 123 and divide the difference (Buff 2−Buff 3) by seven, the result of such division being loaded into the buffer 4. The above described operation externally delivers the data $N_7$ through $N_{13}$ through execution of the steps $n_{13} \to n_{14} \to n_{15} \to n_{16} \to n_{17} \to n_{18} \to n_{16}$ and so on. In this way, the waveform as shown by O is modified and changed into that as shown by X for the delivery of outputs, as is clear from FIG. 4.

Figure 7:
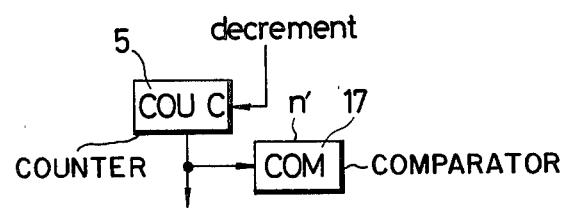
FIG. 7 is a schematic block diagram of a modification in a part of the above illustrated arrangements.
Figure 8:
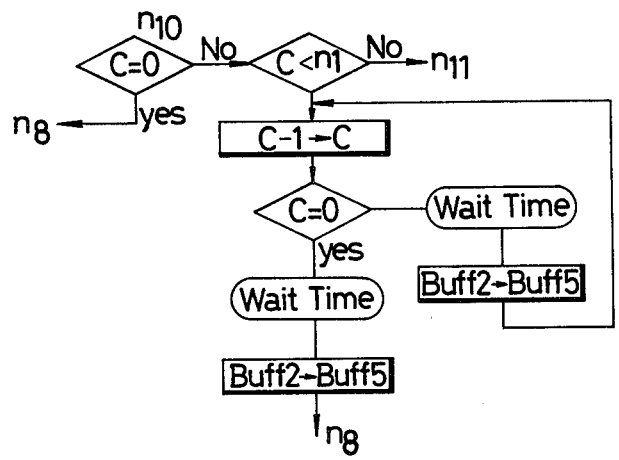
FIG. 8 is a flow chart associated with the modification of FIG. 7.

In the case where the amount of continuous same data is less than that required for the adjustment process, the data is externally outputted as is. For example, the data $N_0$ is delivered in the embodiment of FIG. without suffering from the adjustment process of the present invention. Only the addition of a comparator 17 of FIG. 7 to the arrangement as shown in FIG. 2 is needed, which comparator compares $n'(<n)$. Referring to the flow chart of FIG. 3, if the value C is smaller than $n'$ during the step $n_{10}$, the arithmetic operation $C-1 \to C$ is executed each time the subtraction Buff 2−Buff 5 is carried out. This is accomplished by modifying a part of the arrangement of FIG. 3 as viewed in FIG. 8.

Whereas the present invention has been described with respect to specific embodiments thereof, it will be understood that various changes and modifications will be suggested to one skilled in the art, and it is intended to encompass such changes and modifications as fall within the scope of the appended claims.

We claim:

1. A digital filter comprising:
    first buffer means for temporarily storing data received from an input source;
    second buffer means for temporarily storing data received from said first buffer means;
    subtraction means for detecting the difference between the data stored in said first buffer means and data stored in said second buffer means;
    data modification means responsive to said subtraction means for altering data received from said second buffer means when said difference produced by said subtraction means is greater than a predetermined value;
    third buffer means for temporarily storing data received from said data modification means; and
    oscillator means for producing a periodic signal corresponding to a desired signal transmission rate;
    said third buffer means generating a periodic train of data information in synchronism with said periodic signal.

2. The filter of claim 1 wherein said data modification means attenuates rapid changes in data values by adding or subtracting from data points adjacent to the rapid change in data values.

3. The filter of claim 2 wherein said data modification means alters only data values before a rapid change in said values.

4. The filter of claim 2 wherein said data modification means alters data values both before and after a rapid change in said values.

5. A waveform synthesizer comprising:
    memory means for storing quantized waveform information and recalling said information as digital data;
    first buffer means for temporarily storing said digital data received from said memory means;
    second buffer means for temporarily storing data received from said first buffer means;
    subtraction means for detecting the difference between the data stored in said first buffer means and data stored in said second buffer means;
    data modification means responsive to said subtraction means for altering data received from said second buffer means when said difference produced by said subtraction means is greater than a predetermined value;
    third buffer means for temporarily storing data received from said data modification means;
    oscillator means for producing a periodic signal corresponding to a desired signal transmission rate;
    said third buffer means generating a periodic train of data information in synchronism with said periodic signal; and
    digital to analog converter means for producing an analog signal from said periodic train of data.

6. The synthesizer of claim 5 wherein said data modification means attenuates rapid changes in data values by adding or subtracting from data points adjacent to the rapid change in data values.

7. The synthesizer of claim 6 wherein said data modification means alters only data values before a rapid change in said values.

8. The synthesizer of claim 6 wherein said data modification means alters data values both before and after a rapid change in said values.

9. The synthesizer of claim 6 wherein said memory means comprises a Read Only Memory.

* * * * *